(12) United States Patent
Han

(10) Patent No.: US 11,449,045 B2
(45) Date of Patent: Sep. 20, 2022

(54) ARTIFICIAL INTELLIGENCE DEVICE AND METHOD OF DIAGNOSING MALFUNCTION USING OPERATION LOG AND ARTIFICIAL INTELLIGENCE MODEL

(71) Applicant: LG ELECTRONICS INC., Seoul (KR)

(72) Inventor: Jongwoo Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 516 days.

(21) Appl. No.: 16/557,253

(22) Filed: Aug. 30, 2019

(65) Prior Publication Data

US 2019/0384273 A1 Dec. 19, 2019

(30) Foreign Application Priority Data

Jul. 23, 2019 (KR) .......................... 10-2019-0089186

(51) Int. Cl.
*G05B 23/02* (2006.01)
*G06K 9/62* (2022.01)
*G05B 13/02* (2006.01)
*G06N 3/08* (2006.01)

(52) U.S. Cl.
CPC ....... *G05B 23/0229* (2013.01); *G05B 13/027* (2013.01); *G06K 9/6257* (2013.01); *G06N 3/08* (2013.01)

(58) Field of Classification Search
USPC .......................................... 702/185
See application file for complete search history.

(56) References Cited

U.S. PATENT DOCUMENTS

| | | | |
|---|---|---|---|
| 9,588,135 B1 | 3/2017 | Narasimhan | |
| 2012/0157073 A1 | 6/2012 | Kim et al. | |
| 2014/0024348 A1 | 1/2014 | Hurst et al. | |
| 2019/0064017 A1 | 2/2019 | Shin et al. | |
| 2019/0294157 A1* | 9/2019 | Miyagi | G05B 23/0283 |
| 2019/0302750 A1* | 10/2019 | Oh | G06N 3/0418 |
| 2020/0371858 A1* | 11/2020 | Hayakawa | G06F 11/0778 |

FOREIGN PATENT DOCUMENTS

| | | |
|---|---|---|
| JP | 2018-78616 A | 5/2018 |
| KR | 1998-024006 A | 7/1998 |
| KR | 10-2012-0070420 A | 6/2012 |
| KR | 10-1864860 B1 | 6/2018 |
| KR | 10-2019-0023638 A | 3/2019 |
| KR | 10-2027389 B1 | 10/2019 |

* cited by examiner

*Primary Examiner* — Paul D Lee
(74) *Attorney, Agent, or Firm* — Birch, Stewart, Kolasch & Birch, LLP

(57) ABSTRACT

An artificial intelligence (AI) device includes a sensing unit configured to collect operation log including information on an external environment factor and an operation state of an AI device, a memory configured to store data corresponding to the operation log, and a processor configured to provide the data corresponding to the operation log to an AI model, to acquire information about whether the AI device corresponds to a normal range or a malfunction symptom range, and to perform control based on the acquired information.

20 Claims, 9 Drawing Sheets

ARTIFICIAL INTELLIGENCE DEVICE AND METHOD OF DIAGNOSING MALFUNCTION USING OPERATION LOG AND ARTIFICIAL INTELLIGENCE MODEL

CROSS-REFERENCE TO RELATED APPLICATION

This application claims the benefit of Korean Patent Application No. 10-2019-0089186, filed on Jul. 23, 2019, which is hereby incorporated by reference as if fully set forth herein.

BACKGROUND OF THE INVENTION

Field of the Invention

The present invention relates to an artificial intelligence (AI) device for diagnosing a malfunction by inputting operation log of the AI device to an AI model.

Discussion of the Related Art

Artificial intelligence (AI) refers to one field of computer engineering and information technology of studying a method for making a computer think, learn, and do self-improvement, which is achieved based on human intelligence, and means that a computer emulates an intelligent behavior of the human.

AI is largely related directly and indirectly to other fields of a computer science rather than existing itself. In particular, AI elements have been modernly introduced in various fields of information technology, and there has been an active attempt to use AI to overcome problems of the fields.

Research has been actively conducted into technology of recognizing and learning a surrounding situation using AI and providing information desired by a user in the desired form or performing an operation or function desired by the user.

An electronic device for providing such various operations and functions is referred to as an AI device.

The AI device may malfunction for various reasons. However, it is difficult to recognize malfunction symptom and reason of the malfunctioning AI device except for a high-level expert.

Separate environments in which the AI device is used are different for respective users, and thus it is required to diagnose a malfunction in consideration of a separately used environment.

Accordingly, there has been an increasing need for an AI device for autonomously diagnosing a malfunction based on a separately used environment and determining malfunction symptom.

SUMMARY OF THE INVENTION

Accordingly, the present invention is directed to overcome the above and other problems.

An object of the present invention is to provide an artificial intelligence (AI) device for diagnosing a malfunction of the AI device without help of an expert.

An object of the present invention is to provide an AI device for training an AI model using information sensed by the AI device and diagnosing a malfunction of the trained AI model.

An object of the present invention is to provide an AI device for re-training an AI model in consideration of a separate environment used by the AI device and diagnosing a malfunction in consideration of a separate environment.

An object of the present invention is to provide an AI device for effectively managing information sensed by the AI device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an artificial intelligence (AI) device includes a sensing unit configured to collect operation log including information on an external environment factor and an operation state of an AI device, a memory configured to store data corresponding to the operation log, and a processor configured to provide the data corresponding to the operation log to an AI model, to acquire information about whether the AI device corresponds to a normal range or a malfunction symptom range, and to perform control based on the acquired information.

The AI model may be a neural network trained by labeling information on the normal range or the malfunction symptom range to training data corresponding to the operation log.

The AI device may include the processor that provides the data corresponding to the operation log to the AI model and acquires classification result information about a range corresponding to the operation log among at least one normal range or at least one malfunction symptom range based on a classification value that is output using the provided data by the AI model.

The AI device may include the processor that deletes the data corresponding to the operation log stored in the memory upon determining the AI device corresponds to the normal range.

The AI device may include the processor that stores the data corresponding to the operation log stored in the memory as unusual log in the memory upon determining the AI device corresponds to the malfunction symptom range.

The AI device may include the processor that allows a request for access to the unusual log stored in the memory when there is malfunction receipt corresponding to the acquired information.

The AI device may include the processor that labels information on the normal range to the data corresponding to the operation log and provides the labeled information to the AI model when there is not malfunction receipt corresponding to the acquired information within a preset time.

The AI device may include the processor that labels information on the malfunction symptom range to the data corresponding to the operation log and provides the labeled information to the AI model when there is malfunction receipt corresponding to the acquired information within a preset time.

The AI device may include the sensing unit that includes a dust sensor configured to collect a fine dust concentration as the information on the external environment factor of the AI device, and a motor sensor configured to collect revolutions per minute of a motor as the information on the operation state of the AI device, and wherein the data corresponding to the operation log may be a feature vector indicating the fine dust concentration collected by the dust sensor and the revolutions per minute of the motor collected by the motor sensor.

The AI device may include the processor that provides the data corresponding to the operation log to the AI model and acquires the information about whether the AI device corresponds to the normal range or the malfunction symptom range.

In another aspect, a method of diagnosing a malfunction using operation log and an artificial intelligence (AI) model includes collecting operation log including information on an external environment factor and an operation state of an artificial intelligence (AI) device, providing data corresponding to the operation log to the AI model and acquiring information about whether the AI device corresponds to a normal range or a malfunction symptom range, and performing control based on the acquired information.

The AI model may be a neural network trained by labeling information on the normal range or the malfunction symptom range to training data corresponding to the operation log.

The acquiring the information may include providing the data corresponding to the operation log to the AI model and acquiring classification result information about a range corresponding to the operation log among at least one normal range or at least one malfunction symptom range based on a classification value that is output using the provided data by the AI model.

The performing the control may include determining whether the AI device corresponds to the normal range or the malfunction symptom range based on the acquired information, and deleting the data corresponding to the operation log upon determining the AI device corresponds to the normal range.

The performing control may include determining whether the AI device corresponds to the normal range or the malfunction symptom range based on the acquired information, and storing the data corresponding to the operation log as unusual log upon determining that the AI device corresponds to the malfunction symptom range.

The method may further include acquiring a result value about whether there is malfunction receipt corresponding to the acquired information, and allowing a request for access to the stored unusual log when there is malfunction receipt corresponding to the acquired information.

The method may further include acquiring a result value about whether there is malfunction receipt corresponding to the acquired information wherein a preset time, and labeling the information on the normal range to the data corresponding to the operation log and providing the labeled information to the AI model when there is not malfunction receipt corresponding to the acquired information within a preset time.

The method may further include acquiring a result value about whether there is malfunction receipt corresponding to the acquired information, and labeling the information on the malfunction symptom range to the data corresponding to the operation log and providing the labeled information to the AI model when there is malfunction receipt corresponding to the acquired information within a preset time.

The collecting the operation log may include collecting a fine dust concentration as the information on the external environment factor of the AI device, and collecting revolutions per minute of a motor as the information on the operation state of the AI device, and the acquiring the information may include providing a feature vector indicating the fine dust concentration and the revolutions per minute of the motor to the AI model and acquiring the information about whether the AI device corresponds to the normal range or the malfunction symptom range.

The acquiring the information may include providing data of a time sector corresponding to the operation log to the AI model and acquiring the information about whether the AI device corresponds to the normal range or the malfunction symptom range.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
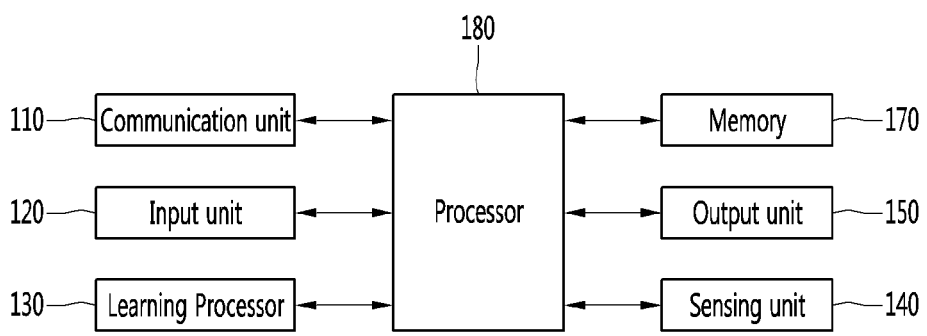
FIG. 1 illustrates an artificial intelligence (AI) device 100 according to an embodiment of the present invention.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

Artificial Intelligence (AI)

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and bias input through the synapse.

Model parameters refer to parameters determined through learning and include a weight value of synaptic connection and bias of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep running is part of machine running. In the following, machine learning is used to mean deep running.

Robot

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

Self-Driving

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

eXtended Reality (XR)

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
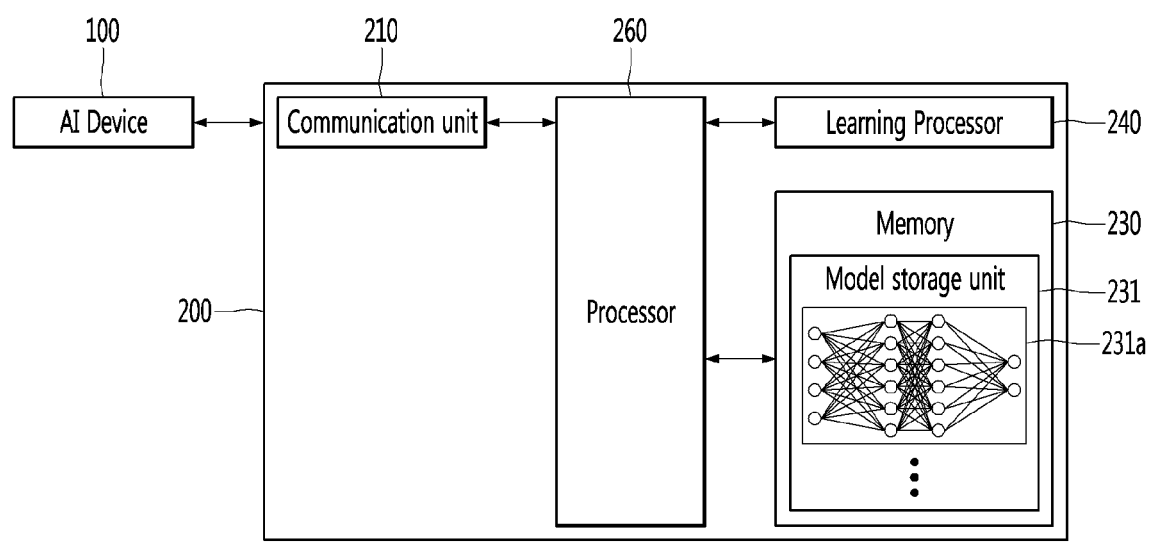
FIG. 2 illustrates an AI server 200 according to an embodiment of the present invention.

FIG. 2 illustrates an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
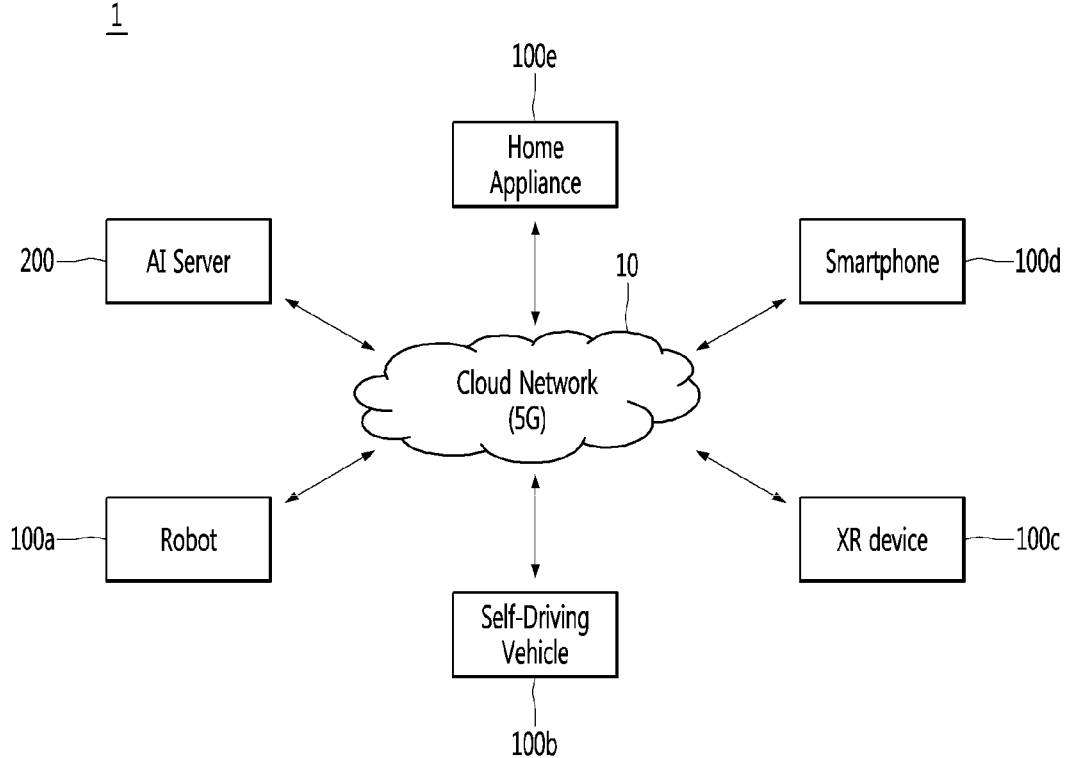
FIG. 3 illustrates an AI system 1 according to an embodiment of the present invention.

FIG. 3 illustrates an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

AI+Robot

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

AI+Self-Driving

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. At this time, the self-driving vehicle 100b may acquire the intention information of the interaction due to the user's operation or speech utterance, and may determine the response based on the acquired intention information, and may perform the operation.

AI+XR

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

AI+Robot+Self-Driving

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

AI+Robot+XR

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

AI+Self-Driving+XR

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the KR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image.

The self-driving vehicle 100b may operate based on the control signal input through the external device such as the XR device 100c or the user's interaction.

First, artificial intelligence (AI) will be described briefly.

Artificial intelligence (AI) is one field of computer engineering and information technology for studying a method of enabling a computer to perform thinking, learning, and self-development that can be performed by human intelligence and may denote that a computer imitates an intelligent action of a human.

Moreover, AI is directly/indirectly associated with the other field of computer engineering without being individually provided. Particularly, at present, in various fields of information technology, an attempt to introduce AI components and use the AI components in solving a problem of a corresponding field is being actively done.

Machine learning is one field of AI and is a research field which enables a computer to perform learning without an explicit program.

In detail, machine learning may be technology which studies and establishes a system for performing learning based on experiential data, performing prediction, and autonomously enhancing performance and algorithms relevant thereto. Algorithms of machine learning may use a method which establishes a specific model for obtaining prediction or decision on the basis of input data, rather than a method of executing program instructions which are strictly predefined.

The term "machine learning" may be referred to as "machine learning".

In machine learning, a number of machine learning algorithms for classifying data have been developed. Decision tree, Bayesian network, support vector machine (SVM), and artificial neural network (ANN) are representative examples of the machine learning algorithms.

The decision tree is an analysis method of performing classification and prediction by schematizing a decision rule into a tree structure.

The Bayesian network is a model where a probabilistic relationship (conditional independence) between a plurality of variables is expressed as a graph structure. The Bayesian network is suitable for data mining based on unsupervised learning.

The SVM is a model of supervised learning for pattern recognition and data analysis and is mainly used for classification and regression.

The ANN is a model which implements the operation principle of biological neuron and a connection relationship between neurons and is an information processing system where a plurality of neurons called nodes or processing elements are connected to one another in the form of a layer structure.

The ANN is a model used for machine learning and is a statistical learning algorithm inspired from a neural network (for example, brains in a central nervous system of animals) of biology in machine learning and cognitive science.

In detail, the ANN may denote all models where an artificial neuron (a node) of a network which is formed through a connection of synapses varies a connection strength of synapses through learning, thereby obtaining an ability to solve problems.

The term "ANN" may be referred to as "neural network".

The ANN may include a plurality of layers, and each of the plurality of layers may include a plurality of neurons. Also, the ANN may include a synapse connecting a neuron to another neuron.

The ANN may be generally defined by the following factors: (1) a connection pattern between neurons of a different layer; (2) a learning process of updating a weight of a connection; and (3) an activation function for generating an output value from a weighted sum of inputs received from a previous layer.

The ANN may include network models such as a deep neural network (DNN), a recurrent neural network (RNN), a bidirectional recurrent deep neural network (BRDNN), a multilayer perceptron (MLP), and a convolutional neural network (CNN), but is not limited thereto.

In this specification, the term "layer" may be referred to as "layer".

The ANN may be categorized into single layer neural networks and multilayer neural networks, based on the number of layers.

General single layer neural networks is configured with an input layer and an output layer.

Moreover, general multilayer neural networks is configured with an input layer, at least one hidden layer, and an output layer.

The input layer is a layer which receives external data, and the number of neurons of the input layer is the same the number of input variables, and the hidden layer is located between the input layer and the output layer and receives a signal from the input layer to extract a characteristic from the received signal and may transfer the extracted characteristic to the output layer. The output layer receives a signal from the hidden layer and outputs an output value based on the received signal. An input signal between neurons may be multiplied by each connection strength (weight), and values obtained through the multiplication may be summated. When the sum is greater than a threshold value of a neuron, the neuron may be activated and may output an output value obtained through an activation function.

The DNN including a plurality of hidden layers between an input layer and an output layer may be a representative ANN which implements deep learning which is a kind of machine learning technology.

The term "deep learning" may be referred to as "deep learning".

The ANN may be trained by using training data. Here, training may denote a process of determining a parameter of the ANN, for achieving purposes such as classifying, regressing, or clustering input data. A representative example of a parameter of the ANN may include a weight assigned to a synapse or a bias applied to a neuron.

An ANN trained based on training data may classify or cluster input data, based on a pattern of the input data.

In this specification, an ANN trained based on training data may be referred to as a trained model.

Next, a learning method of an ANN will be described.

The learning method of the ANN may be largely classified into supervised learning, unsupervised learning, semi-supervised learning, and reinforcement learning.

The supervised learning may be a method of machine learning for analogizing one function from training data.

Moreover, in analogized functions, a function of outputting continual values may be referred to as regression, and a function of predicting and outputting a class of an input vector may be referred to as classification.

In the supervised learning, an ANN may be trained in a state where a label of training data is assigned.

Here, the label may denote a right answer (or a result value) to be inferred by an ANN when training data is input to the ANN.

In this specification, a right answer (or a result value) to be inferred by an ANN when training data is input to the ANN may be referred to as a label or labeling data.

Moreover, in this specification, a process of assigning a label to training data for learning of an ANN may be referred to as a process which labels labeling data to training data.

In this case, training data and a label corresponding to the training data may configure one training set and may be inputted to an ANN in the form of training sets.

Training data may represent a plurality of features, and a label being labeled to training data may denote that the label is assigned to a feature represented by the training data. In this case, the training data may represent a feature of an input object as a vector type.

An ANN may analogize a function corresponding to an association relationship between training data and labeling data by using the training data and the labeling data. Also, a parameter of the ANN may be determined (optimized) through evaluating the analogized function.

The unsupervised learning is a kind of machine learning, and in this case, a label may not be assigned to training data.

In detail, the unsupervised learning may be a learning method of training an ANN so as to detect a pattern from training data itself and classify the training data, rather than to detect an association relationship between the training data and a label corresponding to the training data.

Examples of the unsupervised learning may include clustering and independent component analysis.

In this specification, the term "clustering" may be referred to as "clustering".

Examples of an ANN using the unsupervised learning may include a generative adversarial network (GAN) and an autoencoder (AE).

The GAN is a method of improving performance through competition between two different AIs called a generator and a discriminator.

In this case, the generator is a model for creating new data and generates new data, based on original data.

Moreover, the discriminator is a model for recognizing a pattern of data and determines whether inputted data is original data or fake data generated from the generator.

Moreover, the generator may be trained by receiving and using data which does not deceive the discriminator, and the discriminator may be trained by receiving and using deceived data generated by the generator. Therefore, the generator may evolve so as to deceive the discriminator as much as possible, and the discriminator may evolve so as to distinguish original data from data generated by the generator.

The AE is a neural network for reproducing an input as an output.

The AE may include an input layer, at least one hidden layer, and an output layer.

In this case, the number of node of the hidden layer may be smaller than the number of nodes of the input layer, and thus, a dimension of data may be reduced, whereby compression or encoding may be performed.

Moreover, data outputted from the hidden layer may enter the output layer. In this case, the number of nodes of the output layer may be larger than the number of nodes of the hidden layer, and thus, a dimension of the data may increase, and thus, decompression or decoding may be performed.

The AE may control the connection strength of a neuron through learning, and thus, input data may be expressed as hidden layer data. In the hidden layer, information may be expressed by using a smaller number of neurons than those of the input layer, and input data being reproduced as an output may denote that the hidden layer detects and expresses a hidden pattern from the input data.

The semi-supervised learning is a kind of machine learning and may denote a learning method which uses both training data with a label assigned thereto and training data with no label assigned thereto.

As a type of semi-supervised learning technique, there is a technique which infers a label of training data with no label assigned thereto and performs learning by using the inferred label, and such a technique may be usefully used for a case where the cost expended in labeling is large.

The reinforcement learning may be a theory where, when an environment where an agent is capable of determining an action to take at every moment is provided, the best way is obtained through experience without data.

The reinforcement learning may be performed by a Markov decision process (MDP).

To describe the MDP, firstly an environment where pieces of information needed for taking a next action of an agent may be provided, secondly an action which is to be taken by the agent in the environment may be defined, thirdly a reward provided based on a good action of the agent and a penalty provided based on a poor action of the agent may be defined, and fourthly an optimal policy may be derived through experience which is repeated until a future reward reaches a highest score.

An artificial neural network has a configuration that is specified by a configuration of a model, an activation function, a loss function or a cost function, a learning algorithm, an optimization algorithm, or the like, a hyperparameter may be preset before learning, and then, a model parameter may be set through learning to specify information.

For example, a factor for determining a configuration of the artificial neural network may include the number of hidden layers, the number of hidden nodes included in each hidden layer, an input feature vector, a target feature vector, or the like.

The hyperparameter may include various parameters that need to be initially set for learning, such as an initial value of the model parameter. The model parameter may include various parameters to be determined through learning.

For example, the hyperparameter may include a weight initial value between nodes, a bias initial value between nodes, a size of mini-batch, a number of repetitions of learning, a learning rate, or the like. The model parameter may include a weight between nodes, bias between nodes, or the like.

The loss function can be used for an index (reference) for determining optimum model parameters in a training process of an artificial neural network. In an artificial neural network, training means a process of adjusting model parameters to reduce the loss function and the object of training can be considered as determining model parameters that minimize the loss function.

The loss function may mainly use mean square error (MSE) or cross entropy error (CEE), but the present invention is not limited thereto.

The CEE may be used when a correct answer label is one-hot encoded. One-hot encoding is an encoding method for setting a correct answer label value to 1 for only neurons corresponding to a correct answer and setting a correct answer label to 0 for neurons corresponding to a wrong answer.

A learning optimization algorithm may be used to minimize a loss function in machine learning or deep learning, as the learning optimization algorithm, there are Gradient Descent (GD), Stochastic Gradient Descent (SGD), Momentum, NAG (Nesterov Accelerate Gradient), Adagrad, AdaDelta, RMSProp, Adam, and Nadam.

The GD is a technique that adjusts model parameters such that a loss function value decreases in consideration of the gradient of a loss function in the current state.

The direction of adjusting model parameters is referred to as a step direction and the size of adjustment is referred to as a step size.

In this case, the step size may refer to a learning rate.

The GD may partially differentiate the loss function with each of model parameters to acquire gradients and may change and update the model parameters by the learning rate in the acquired gradient direction.

The SGD is a technique that increases the frequency of gradient descent by dividing training data into mini-batches and performing the GD for each of the mini-batches.

The Adagrad, AdaDelta, and RMSProp in the SGD are techniques that increase optimization accuracy by adjusting the step size. The momentum and the NAG in the SGD are techniques that increase optimization accuracy by adjusting the step direction. The Adam is a technique that increases optimization accuracy by adjusting the step size and the step direction by combining the momentum and the RMSProp. The Nadam is a technique that increases optimization accuracy by adjusting the step size and the step direction by combining the NAG and the RMSProp.

The learning speed and accuracy of an artificial neural network greatly depends on not only the structure of the artificial neural network and the kind of a learning optimization algorithm, but the hyperparameters. Accordingly, in order to acquire a good trained model, it is important not only to determine a suitable structure of an artificial neural network, but also to set suitable hyperparameters.

In general, hyperparameters are experimentally set to various values to train an artificial neural network, and are set to optimum values that provide stable learning speed and accuracy using training results.

Figure 4:
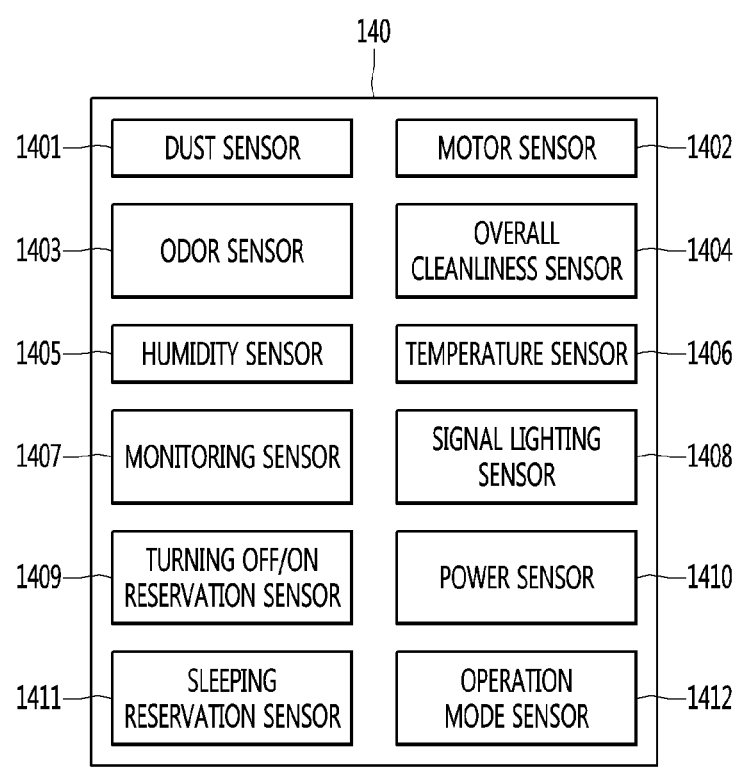
FIG. 4 is a diagram for explanation of a sensing unit 140 according to an embodiment of the present invention.

FIG. 4 is a diagram for explanation of a sensing unit 140 according to an embodiment of the present invention.

Referring to FIG. 4, the sensing unit 140 of the AI device 100 may collect operation log including information on an external environment factor and an operation state of the AI device 100. The operation log may include information on at least one of fine dust concentration, superfine dust concentration, ultra superfine dust concentration, an odor concentration value, air pollution, dust pollution, odor pollution, overall cleanliness, a humidity value, or a temperature value, which is the information on the external environment factor. The operation log may include information on at least one of a sensor monitoring ON/OFF state, a signal lighting ON/OFF state, a turning off/on reservation time, whether an operation is performed, a sleeping reservation time, or an operation mode, which is the information on the operation state.

The memory 170 of the AI device 100 may store data corresponding to the operation log.

The sensing unit 140 may include a dust sensor 1401 for collecting fine dust concentration, superfine dust concentration, or ultra superfine dust concentration. The dust sensor 1401 may collect fine dust concentration that is the information on the external environment factor of the AI device 100.

When the AI device 100 uses a motor, the sensing unit 140 may include a motor sensor 1402 for collecting revolutions per minute of the motor of the AI device 100. The motor sensor 1402 may collect the revolutions per minute of the motor, which it the operation on the operation state of the AI device.

The sensing unit 140 may include an odor sensor 1403 for collecting the odor concentration value or the air pollution.

The sensing unit 140 may include an overall cleanliness sensor 1404 for collecting the overall cleanliness based on dust pollution and odor pollution.

The sensing unit 140 may include a humidity sensor 1405 for collecting the humidity value.

The sensing unit 140 may include a temperature sensor 1406 for collecting the temperature value.

The sensing unit 140 may include a monitoring sensor 1407 for collecting the sensor monitoring ON/OFF state.

The sensing unit 140 may include a signal lighting sensor 1408 for collecting the signal lighting ON/OFF state.

The sensing unit 140 may include a turning off/on reservation sensor 1409 for collecting a turning off or on reservation time of the AI device 100.

The sensing unit 140 may include a power sensor 1410 for collecting information on whether the AI device 100 performs an operation.

The sensing unit 140 may include a sleeping reservation sensor 1411 for collecting a sleeping reservation time of the AI device 100.

The sensing unit 140 may include an operation mode sensor 1412 for collecting information on an operation mode of the AI device 100.

Figure 5:
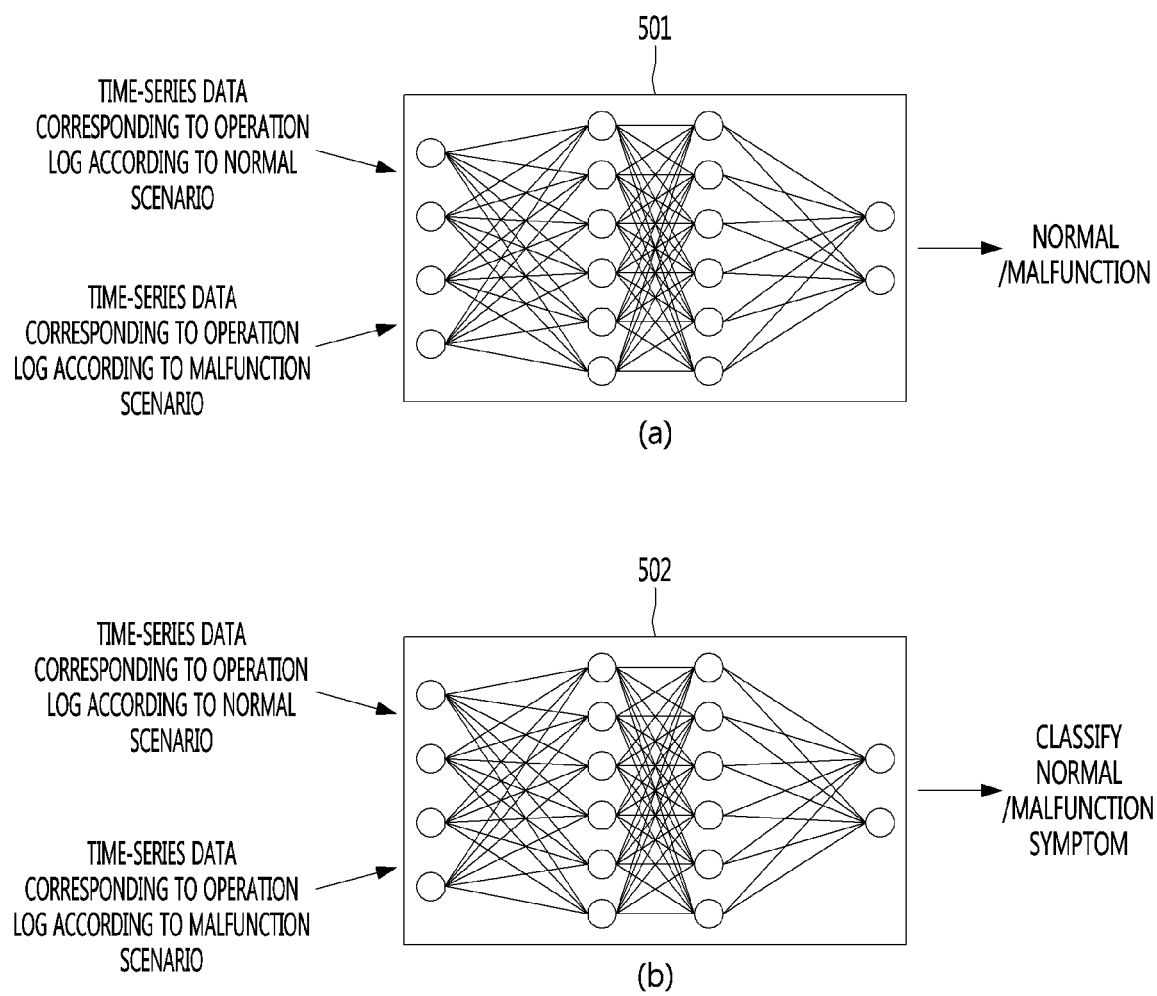
FIG. 5 is a diagram for explanation of a method of generating an AI model according to an embodiment of the present invention.

FIG. 5 is a diagram for explanation of a method of generating an AI model according to an embodiment of the present invention.

The AI model according to an embodiment of the present invention may be trained to predict whether the AI device normally operates or malfunctions, or may be trained to predict a malfunction symptom.

The AI model may be a neural network trained by labeling information on the normal range or the malfunction symptom range to training data corresponding to the operation log. The neural network may be referred to as an AI model. The AI model may be trained in the AI server 200 and may be installed in the AI device 100. The AI device 100 may train the neural network.

First, referring to FIG. 5A, a training method of predicting whether the AI device is normal or malfunctions will be described.

The AI server 200 may label the information on the normal range or the malfunction symptom range to the data corresponding to the operation log and may train a neural network 501.

The AI server 200 may label the information on the normal range to the training data corresponding to the operation log according to a normal scenario and may label the information on the malfunction symptom range to the training data corresponding to the operation log according to a malfunction scenario and may train the neural network 501.

In detail, the AI server 200 may collect the operation log including the information on the external environment factor and the operation state of the AI device 100 using a sensor and may convert the collected operation log into the data corresponding to the operation log. The AI server 200 may train the neural network using, as an output value, a state (an operation within the normal range or an operation within the malfunction symptom range) of the AI device when the operation log of the AI device is collected as an input value of the data corresponding to the operation log. Here, the state (the operation within the normal range or the operation within the malfunction symptom range) of the AI device may be an answer that needs to be inferred using the data corresponding to the operation log by the neural network.

Accordingly, the AI server 200 may label the information on the normal range or the malfunction symptom range to the data corresponding to the operation log and may provide the labeled information to the neural network.

In this case, the neural network may infer a function of a relationship between the data corresponding to the operation log and the information on whether the AI device is normal/ malfunctions using the information on the normal range or the malfunction symptom range corresponding to the operation log. Through estimation of the function inferred by the neural network, a parameter (a weight, bias, or the like) of the neural network may be determined (optimized).

The AI server 200 may train the neural network using data corresponding to a predetermined time period.

In detail, the operation log including the information on the external environment factor and the operation state may be collected in time-series while the AI device 100 operates, and accordingly the data corresponding to the operation log may also be the data that is collected in time-series.

In this case, the AI server 200 may train the neural network by separating the data collected in time-series according to a predetermined time period and labeling the information on the normal range or the malfunction symptom range to the separate data.

For example, the AI server 200 may separate the data collected in time-series in units of 1 second. The AI server 200 may train the neural network by labeling the information on the normal range or the malfunction symptom range to the data corresponding to a time period of 1 second and may then train the neural network by labeling the information on the normal range or the malfunction symptom range to the data corresponding to a next time period of 1 second.

The AI server 200 may train the neural network using the operation log collected through various types of AI devices 100 and various types of sensors, and the state of the AI device when the operation log is generated.

Here, when the AI device 100 has various types, this means that the AI device is a robot 100a, an autonomous vehicle 100b, XR device 100c, a smartphone 100d, or a home appliance 100e. For example, the AI device 100 may be an air cleaner.

When the sensor has various types, this means that there is at least one sensor for collecting a surrounding environment factor in which the AI device is used or collecting the state in which the AI device operates. For example, when the AI device 100 is an air cleaner, the external environment factor of the air cleaner may be collected or the operation log including the information on the operation state of the air cleaner may be collected through at least one of the dust sensor 1401, the motor sensor 1402, the odor sensor 1403, the overall cleanliness sensor 1404, the humidity sensor 1405, the temperature sensor 1406, the monitoring sensor 1407, the signal lighting sensor 1408, the turning off/on reservation sensor 1409, the power sensor 1410, the sleeping reservation sensor 1411, or the operation mode sensor 1412.

With reference to FIG. 5B, a training method of predicting a range to which the AI device corresponds among at least one normal range or at least one malfunction symptom range by the AI model will be described. In addition, only a difference from in FIG. 5A will be described.

The AI server 200 may label information on at least one normal range or at least one malfunction symptom range to the data corresponding to the operation log and may provide the labeled information to the neural network. In this case, a classification value may also be set to each of the at least one of normal range or the at least one malfunction symptom range.

For example, the state of the AI device when the operation log of the AI device is collected may be classified into a plurality of ranges. When the AI device is an air cleaner, the state of the AI device may be classified into at least one normal range or at least one malfunction symptom range for each separate usage environment of the air cleaner. For example, when the air cleaner is used in an industrial site in which a large amount of dust is generated, although revolutions per minute of a motor of the air cleaner is higher than other usage environments but dust concentration is not reduced by a large width, the state of the AI device may be classified into the normal range. When the air cleaner is used indoor in homes, as revolutions per minute of the motor is increased, dust concentration is inverse-proportionally reduced and the state of the AI device may be classified into the normal range. When the dust sensor of the air cleaner malfunctions and dust concentration is measured to be non-uniform irrespective of the revolutions per minutes of the motor, the state of the AI device may be classified into the malfunction symptom range in which the dust sensor malfunctions. Alternatively, when the revolutions per minute of the motor of the air cleaner is measured to be uniform irrespective of the dust concentration, the state of the AI device may be classified into the malfunction symptom range in which the motor malfunctions.

The AI server 200 may train the neural network using, as an output value, a state (an operation within the normal range or an operation within the malfunction symptom range) of the AI device when the operation log of the AI device is collected as an input value of the data corresponding to the operation log. Here, the state of the AI device may be an answer that needs to be inferred using the data corresponding to the operation log by the neural network. The output value may be a classification value that is set for each of at least one normal range or at least one malfunction symptom range. Accordingly, classification result information about a range corresponding to the operation log among at least one normal range or at least one malfunction symptom range may be acquired based on the classification value.

The AI server 200 may label the at least one normal range or the at least one malfunction symptom range to the data corresponding to the operation log and may provide the labeled information to the neural network.

In this case, the neural network may infer a function of a relationship between the data corresponding to the operation log and information on an AI state using the data corresponding to the operation log and the at least one normal range or the at least one malfunction symptom range. Through estimation of the function inferred by the neural network, a parameter (a weight, bias, or the like) of the neural network may be determined (optimized).

The AI server 200 may train the neural network by separating the data collected in time-series according to a predetermined time period and labeling the at least one normal range or the at least one malfunction symptom range to the separate data.

The neural network trained using the above method may be referred to as an AI model.

The AI model may be installed in the AI device 100.

In detail, the AI model may be embodied in the form of hardware, software, or a combination of hardware and software. When an entire or partial part of the AI model is embodied in the form of software, one or more commands configured in the AI model may be stored in the memory 170 of the AI device.

When the neural network is trained using the data corresponding to the operation log, the data may be referred to as training data corresponding to the operation log.

Figure 6:
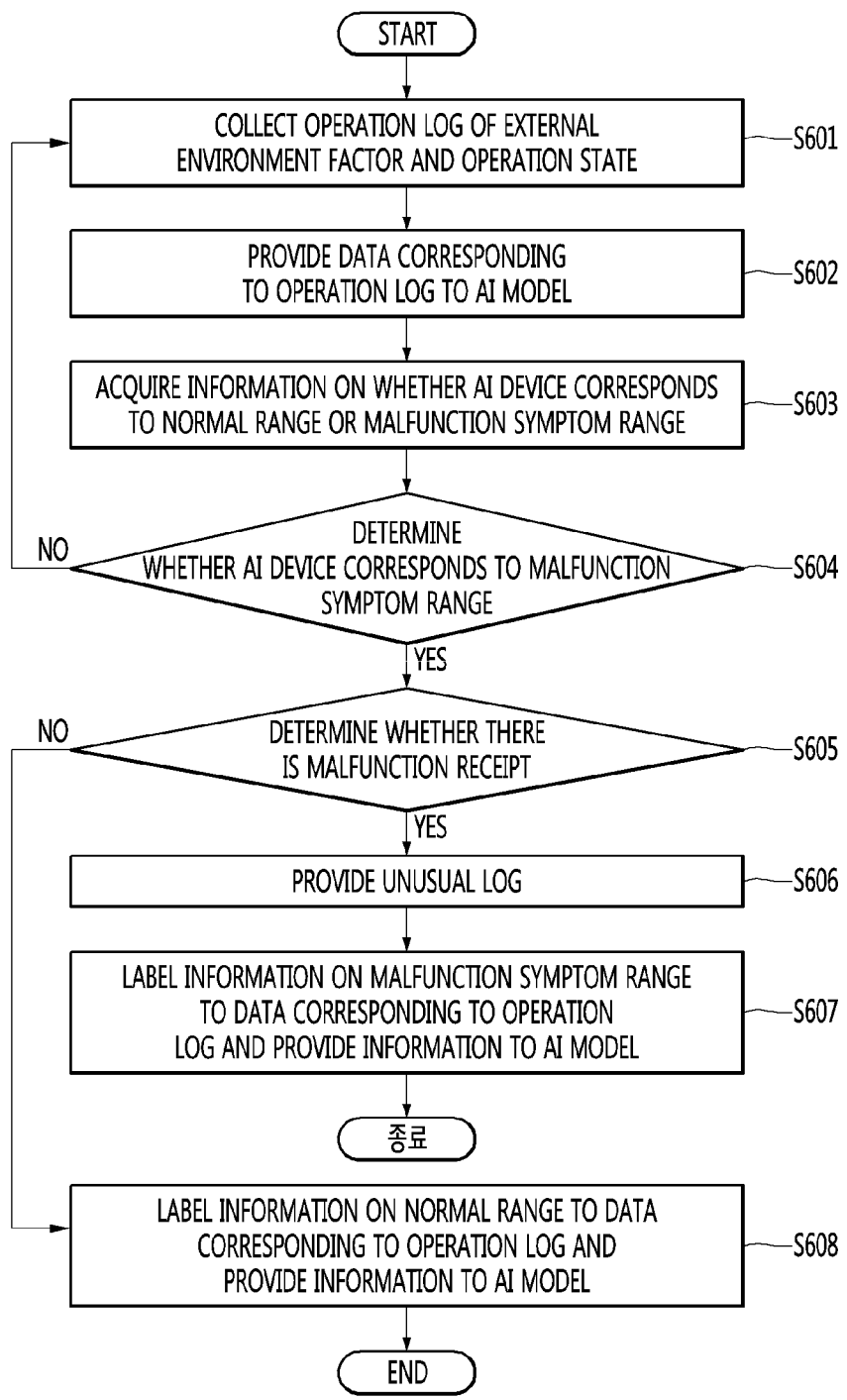
FIG. 6 is an operational flowchart showing a method of diagnosing a malfunction using operation log and an AI model by an AI device according to an embodiment of the present invention.

FIG. 6 is an operational flowchart showing a method of diagnosing a malfunction using operation log and an AI model by an AI device according to an embodiment of the present invention.

The sensing unit 140 may collect operation log including information on the external environment factor and the operation state of the AI device 100 (S601).

The processor 180 may provide the data corresponding to the operation log to the AI model (S602).

The processor 180 may acquire information on a range to which the AI device 100 corresponds among the normal range or the malfunction symptom range (S602).

Accordingly, the processor 180 may provide the data corresponding to the operation log to the AI model and may acquire information on whether the AI device corresponds to the normal range or the malfunction symptom range.

The processor 180 may output the information on whether the AI device 100 corresponds to the normal range or the malfunction symptom range through the output unit 150 or may transmit the information to an external electronic device through the communication unit 110.

The processor 180 may perform control based on the acquired information.

The processor 180 may perform control to output the information on whether the AI device 100 corresponds to the normal range or the malfunction symptom range, through the output unit 150. Accordingly, a user of the AI device 100 may recognize whether the AI device 100 normally or abnormally operates.

The processor 180 may perform control to transmit the information on whether the AI device 100 corresponds to the normal range or the malfunction symptom range to another AI device or an AI server, through the communication unit 110.

For example, the processor 180 may transmit the information on whether the AI device 100 corresponds to the normal range or the malfunction symptom range to a server of a service center managed by a manufacturer of the AI device 100, through the communication unit 110.

When the AI device 100 corresponds to the malfunction symptom range based on the acquired information, the processor 180 may also perform control to terminate an operation of the AI device 100.

The processor 180 may perform control to store or delete the data corresponding to the operation log according to the acquired information.

The processor 180 may determine whether the AI device 100 corresponds to the normal range or the malfunction symptom range based on the acquired information (S604).

When the AI device 100 is determined to correspond to the normal range, the processor 180 may delete the data corresponding to the operation log stored in the memory 170. Accordingly, the entire operation log may not be stored and the operation log may be effectively managed.

When the AI device 100 is determined to correspond to the malfunction symptom range, the processor 180 may store the data corresponding to the operation log stored in the memory 170. Accordingly, the entire operation log may not be stored and log for recognize the reason of a malfunction may be managed using separate unusual log.

The processor 180 may acquire a result value about whether there is malfunction receipt corresponding to the acquired information. For example, the result value about whether there is malfunction receipt may be received from the input unit 120 of the AI device 100 or a result value about whether there is malfunction receipt may be acquired through the communication unit 110.

Accordingly, the processor 180 may determine whether there is malfunction receipt (S605)

When there is malfunction receipt corresponding to the information on whether the AI device 100 corresponds to the normal range or the malfunction symptom range, the processor 180 may allow a request for access to the unusual log (S606). The processor 180 may receive the request for access to the unusual log through the input unit 120 of the AI device 100 or may receive the request through the communication unit 110. Accordingly, when there is malfunction receipt, the AI device 100 may provide unusual log therewith and thus may easily diagnose and overcome malfunction symptom.

When there is malfunction receipt corresponding to the information on whether the AI device corresponds to the normal range or the malfunction symptom range within a preset time, the processor 180 may label the information on the malfunction symptom range to the data corresponding to the operation log and may provide the labeled information to the AI model (S607). Accordingly, the processor 180 may re-train the AI model and may ensure an optimized AI model according to a separate usage environment of the AI device.

When there is not malfunction receipt corresponding to the information on whether the AI device corresponds to the normal range or the malfunction symptom range within a preset time, the processor 180 may label the information on the normal range to the data corresponding to the operation log and may provide the labeled information to the AI model (S608). Accordingly, the processor 180 may re-train the AI model and may ensure an optimized AI model according to a separate usage environment of the AI device.

For example, when the air cleaner is used in a space in which a large amount of dust is generated, revolutions per minute of the motor of the air cleaner is higher than revolutions per minute of the motor of the air cleaner in other environments but dust concentration may not be reduced by a large width. In this case, the air cleaner may be determined to correspond to the malfunction symptom range, but when there is not malfunction receipt within a preset time, the air cleaner may be determined to correspond to the normal range and the AI model may be re-trained.

Figure 7:
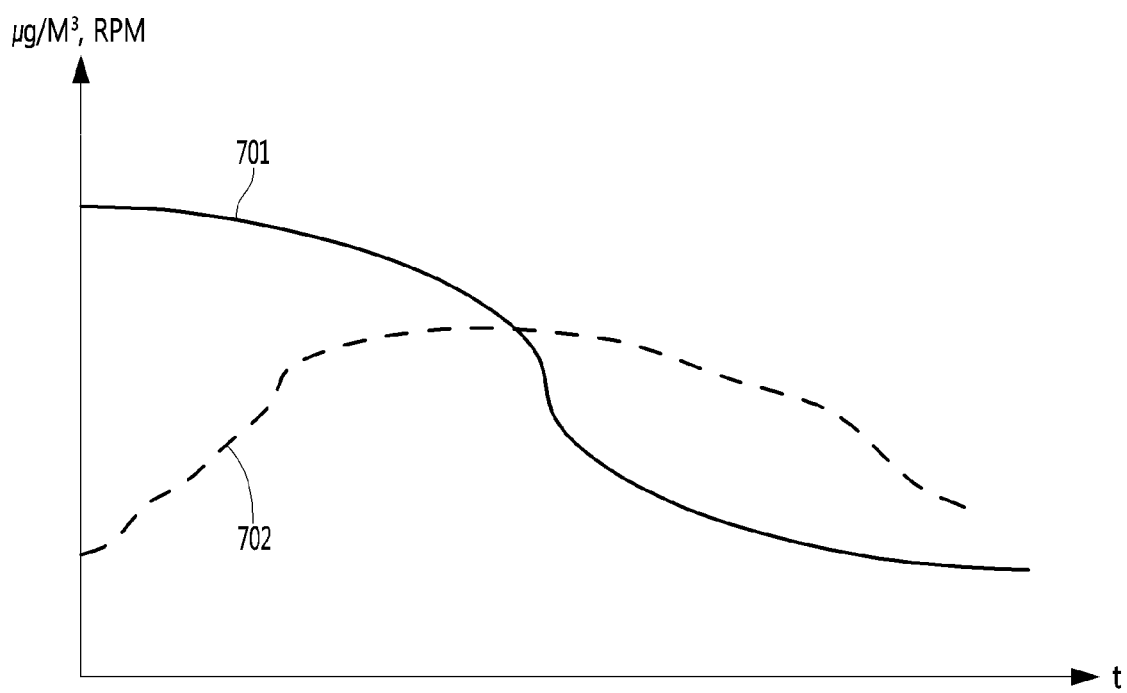
FIGS. 7 to 9 are diagrams for explanation of data corresponding to the operation log learned by an AI model of an AI device according to an embodiment of the present invention.
Figure 8:
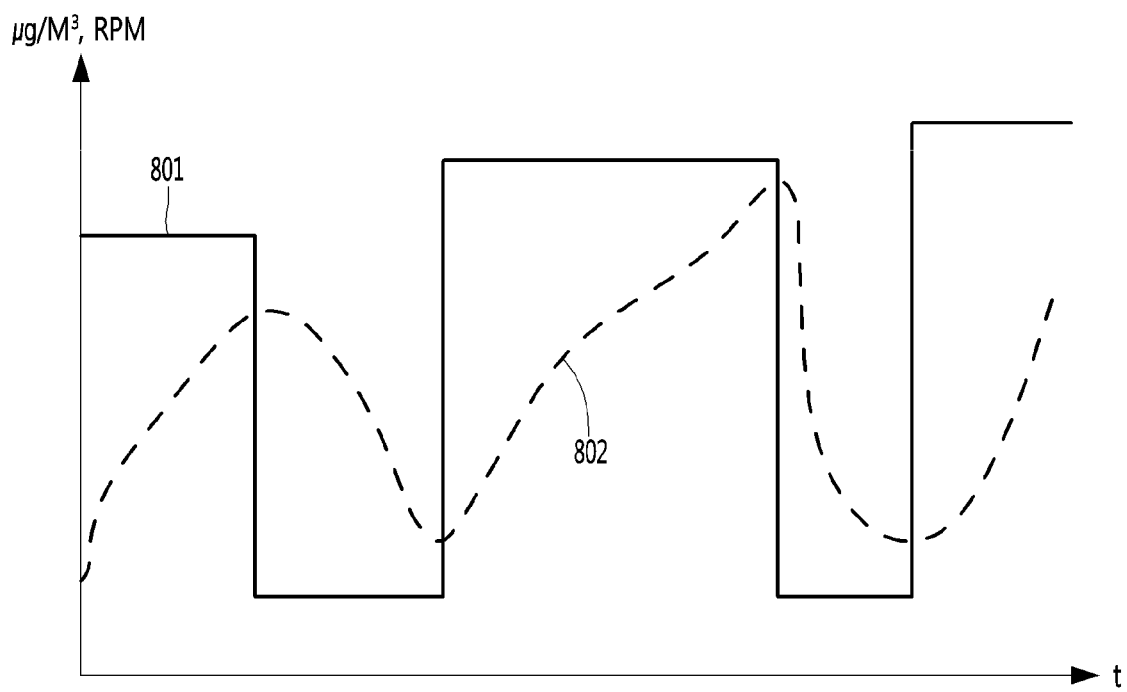
Figure 9:
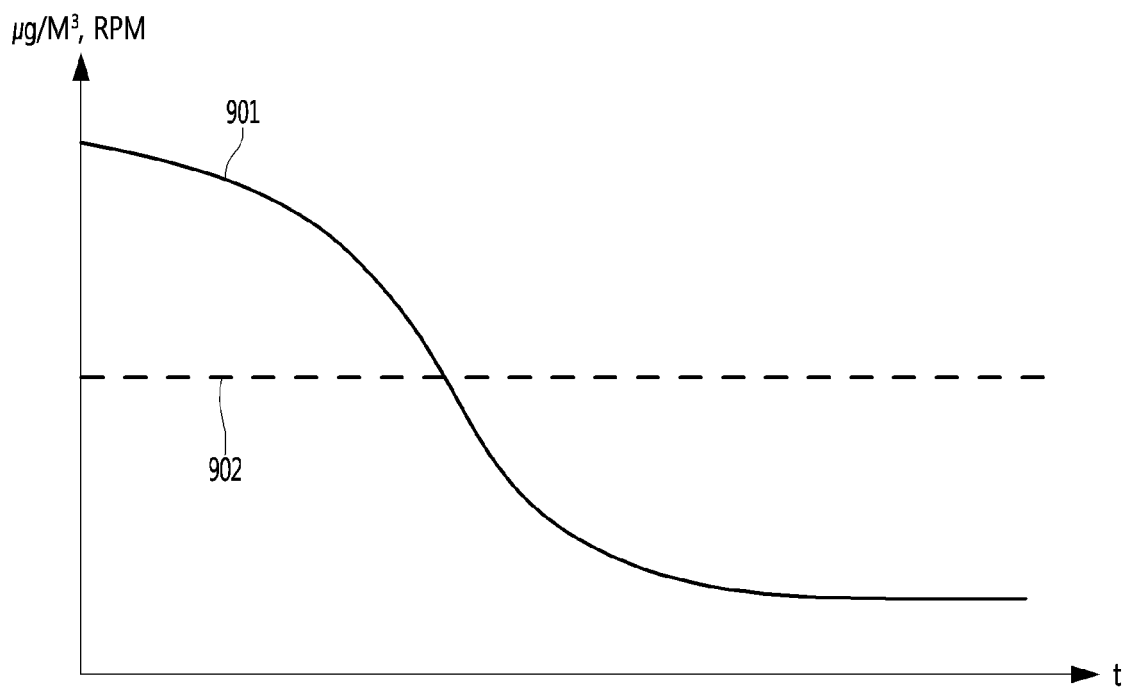

FIGS. 7 to 9 are diagrams for explanation of data corresponding to the operation log learned by an AI model of an AI device according to an embodiment of the present invention.

The sensing unit 140 of the AI device 100 may include the dust sensor 1401 for collecting fine dust concentration that is the information on the external environment factor of the AI device 100, and the motor sensor 1402 for collecting revolutions per minute of a motor, which is the information on the operation state of the AI device 100.

The processor 180 may acquire data corresponding to the operation log collected from the dust sensor 1401 and the motor sensor 1402.

The processor 180 may store data corresponding to the acquired operation log in the memory 170.

In detail, the processor 180 may convert the operation log collected using the dust sensor 1401 and the motor sensor 1402 into the data corresponding to the operation log. Here, the data corresponding to the operation log may be a feature vector indicating at least one of fine dust concentration ($\mu g/M^3$) and revolutions per minute (RPM) of the motor.

In this case, the processor 180 may convert the operation log into data with the same format as data used as training data of the AI model. When the AI model is generated using data of a predetermined time period as training data, the processor 180 may provide the data of the predetermined time period to the AI model.

FIGS. 7 to 9 are graphs showing change in fine dust concentration ($\mu g/M^3$) and revolutions per minutes (RPM) of a motor as a time t elapses as an example of time-series data corresponding to operation log according to a normal/malfunction scenario of an air cleaner.

FIG. 7 is a change graph of a case in which an air cleaner normally operates.

A fine dust concentration 701 decreases with increase in revolutions per minute 702 of a motor, and the revolutions per minute 702 of the motor decreases with reduction in the fine dust concentration 701. Accordingly, the time-series data corresponding to the operation log according to the normal scenario may be labeled to information on the normal range and may be used to train the AI model.

FIG. 8 is a change graph of an example of a case in which a dust sensor malfunctions.

A dust sensor malfunctions, and thus fine dust concentration 801 is measured to be drastically increases and then drastically decreased, and a motor normally operates, and thus revolutions per minute 802 of the motor is measured with change in concentration. Accordingly, time-series data corresponding to the operation log according to dust sensor malfunction scenario may be labeled to information on a malfunction symptom (dust sensor malfunction) range and may be used to train the AI model.

FIG. 9 is a graph showing an example of a case in which a motor malfunctions.

Fine dust concentration 901 decreases, but revolutions per minute 902 of a motor, which needs to decrease based on the fine dust concentration, may be maintained constant irrespective of change in fine dust concentration. Accordingly, time-series data corresponding to the operation log based on motor malfunction scenario may be labeled to the information on the malfunction symptom (motor malfunction) range and may be used to train the AI model.

The processor 180 may provide a feature vector indicting the fine dust concentration and the revolutions per minute of the motor to the AI model and may acquire information on whether the AI device corresponds to the normal range or the malfunction symptom range.

According to an embodiment of the present invention, a malfunction of the AI device may be diagnosed without help of an expert.

According to an embodiment of the present invention, the AI model may be trained using information sensed by the AI device, and the malfunction of the AI device may be diagnosed using the trained AI model.

According to an embodiment of the present invention, a malfunction of the AI device may be diagnosed in consideration of a separate environment in which the AI device is used.

According to an embodiment of the present invention, only operation log to be stored may be separated and log may be effectively managed without storing entire operation log of a factor of an environment for using the AI device and the operation state of the AI device.

In addition, according to an embodiment of the present invention, the malfunction symptom and reason of the AI device may be recognized, and thus malfunction receipt and repair may be effectively performed.

The aforementioned present invention can also be embodied as computer readable code stored on a computer readable recording medium. The computer readable recording medium is any data storage device that can store data which can thereafter be read by a computer. Examples of the computer readable recording medium include a hard disk drive (HDD), a solid state drive (SSD), a silicon disk drive (SDD), read-only memory (ROM), random-access memory (RAM), CD-ROM, magnetic tapes, floppy disks, optical data storage devices, etc. The computer may also include the processor 180 of a terminal.

What is claimed is:

1. An artificial intelligence (AI) device comprising:
at least one sensor configured to collect an operation log including information on an external environment factor and an operation state of the AI device;
a memory configured to store data corresponding to the operation log; and
a processor configured to provide the data corresponding to the operation log to an AI model, to acquire information about whether the AI device corresponds to a normal state or a malfunction symptom state, and to perform control based on the acquired information,
wherein the at least one sensor is configured to collect a fine dust concentration as the information on the external environment factor, and revolutions per minute of a motor as the information on the operation state, and
wherein the data corresponding to the operation log is a feature vector indicating the fine dust concentration and the revolutions per minute of the motor collected by the at least one sensor.

2. The AI device of claim 1, wherein the AI model is a neural network trained by labeling the information on the normal state or the malfunction symptom state to training data corresponding to the operation log.

3. The AI device of claim 1, wherein the processor provides the data corresponding to the operation log to the AI model and acquires classification result information about a state corresponding to the operation log among at least one normal state or at least one malfunction symptom state based on a classification value that is output using the provided data by the AI model.

4. The AI device of claim 1, wherein the processor deletes the data corresponding to the operation log stored in the memory upon determining the AI device corresponds to the normal state.

5. The AI device of claim 1, wherein the processor stores the data corresponding to the operation log stored in the memory as an unusual log in the memory upon determining the AI device corresponds to the malfunction symptom state.

6. The AI device of claim 5, wherein the processor allows a request for access to the unusual log stored in the memory when there is malfunction receipt corresponding to the acquired information.

7. The AI device of claim 1, wherein the processor labels the information on the normal state to the data corresponding to the operation log and provides the labeled information to the AI model when there is not malfunction receipt corresponding to the acquired information within a preset time.

8. The AI device of claim 1, wherein the processor labels the information on the malfunction symptom state to the data corresponding to the operation log and provides the labeled information to the AI model when there is malfunction receipt corresponding to the acquired information within a preset time.

9. The AI device of claim 1, wherein the at least one sensor includes a dust sensor configured to collect the fine dust concentration as the information on the external environment factor of the AI device, and a motor sensor configured to collect the revolutions per minute of the motor as the information on the operation state of the AI device.

10. The AI device of claim 1, wherein the processor provide data of a time sector corresponding to the operation log to the AI model and acquires the information about whether the AI device corresponds to the normal state or the malfunction symptom state.

11. The AI device of claim 10, wherein the data corresponding to the operation log collected in time-series is separated to a predetermined time sector.

12. A method of diagnosing a malfunction using an operation log and an artificial intelligence (AI) model, the method comprising:
collecting the operation log including information on an external environment factor and an operation state of an artificial intelligence (AI) device;
providing data corresponding to the operation log to the AI model and acquiring information about whether the AI device corresponds to a normal state or a malfunction symptom state; and
performing control based on the acquired information,
wherein the collecting the operation log includes:
collecting a fine dust concentration as the information on the external environment factor; and
collecting revolutions per minute of a motor as the information on the operation state, and
wherein the acquiring the information includes providing a feature vector indicating the fine dust concentration and the revolutions per minute of the motor to the AI model.

13. The method of claim 12, wherein the AI model is a neural network trained by labeling the information on the normal state or the malfunction symptom state to training data corresponding to the operation log.

14. The method of claim 12, wherein the acquiring the information includes providing the data corresponding to the operation log to the AI model and acquiring classification result information about a state corresponding to the operation log among at least one normal state or at least one malfunction symptom state based on a classification value that is output using the provided data by the AI model.

15. The method of claim 12, wherein the performing the control includes:
determining whether the AI device corresponds to the normal state or the malfunction symptom state based on the acquired information; and
deleting the data corresponding to the operation log upon determining the AI device corresponds to the normal state.

16. The method of claim 12, wherein the performing the control includes:
determining whether the AI device corresponds to the normal state or the malfunction symptom state based on the acquired information; and
storing the data corresponding to the operation log as an unusual log upon determining that the AI device corresponds to the malfunction symptom state.

17. The method of claim 16, further comprising:
acquiring a result value about whether there is malfunction receipt corresponding to the acquired information; and
allowing a request for access to the stored unusual log when there is the malfunction receipt corresponding to the acquired information.

18. The method of claim 12, further comprising:
acquiring a result value about whether there is malfunction receipt corresponding to the acquired information within a preset time; and
labeling the information on the normal state to the data corresponding to the operation log and providing the labeled information to the AI model when there is not the malfunction receipt corresponding to the acquired information within the preset time.

19. The method of claim 12, further comprising:
acquiring a result value about whether there is malfunction receipt corresponding to the acquired information; and
labeling the information on the malfunction symptom state to the data corresponding to the operation log and providing the labeled information to the AI model when there is the malfunction receipt corresponding to the acquired information within a preset time.

20. The method of claim 12, wherein the acquiring the information includes providing data of a time sector corresponding to the operation log to the AI model and acquiring the information about whether the AI device corresponds to the normal state or the malfunction symptom state.

* * * * *